United States Patent [19]

Gavrila

[11] Patent Number: 4,979,540
[45] Date of Patent: Dec. 25, 1990

[54] CARTRIDGE-TYPE DIRECT LOADED SAFETY AND PRESSURE-RELIEF VALVE HAVING FLOW PATH FOR PREVENTING SUPERSONIC FLOW AND MINIMIZING VALVE HYSTERESIS

[75] Inventor: Gelu N. Gavrila, Parsippany, N.J.

[73] Assignee: Teledyne Industries, Inc., Los Angeles, Calif.

[21] Appl. No.: 291,671

[22] Filed: Dec. 29, 1988

[51] Int. Cl.$^5$ ............................................. F16K 17/30
[52] U.S. Cl. ..................... 137/477; 137/476
[58] Field of Search .................. 137/474, 484.2, 484.4, 137/509, 540, 476, 477, 478

[56] References Cited

U.S. PATENT DOCUMENTS

| | | | |
|---|---|---|---|
| 675,513 | 6/1901 | Kaplinger | 137/474 |
| 773,641 | 11/1904 | Hayden | 137/474 |
| 2,517,858 | 8/1950 | Farris | 137/478 X |
| 2,821,208 | 1/1958 | Farris | 137/478 |
| 2,878,828 | 3/1959 | Klafstad | 137/478 |
| 3,001,545 | 9/1961 | Ziege | 137/478 |
| 3,354,900 | 11/1967 | Ferrill | 137/477 |
| 3,520,326 | 7/1970 | Bowen et al. | 137/477 |
| 3,543,777 | 12/1970 | Howes | 137/478 X |
| 3,583,431 | 6/1971 | Diel | 137/474 |
| 3,854,494 | 12/1974 | Zahorsky | 137/478 X |
| 4,109,675 | 8/1978 | Acar | 137/494 |
| 4,130,130 | 12/1978 | Stewart et al. | 137/475 |
| 4,480,660 | 11/1984 | Bayart et al. | 137/478 |
| 4,708,164 | 11/1987 | Scallan | 137/477 X |

FOREIGN PATENT DOCUMENTS

| | | | |
|---|---|---|---|
| 1159335 | 6/1958 | France | 137/474 |
| 2202248 | 5/1974 | France | |
| 571769 | 1/1958 | Italy | 137/477 |
| 2064069 | 6/1981 | United Kingdom | |

OTHER PUBLICATIONS

National Board of Boiler and Pressure Vessel Inspectors, *Pressure Relieving Device Certifications* (1979 Edition), p. 315.

Teledyne Farris Engineering, *Series 2740UL Pressure Relief Valves for Air, Steam, Vapor & Liquid Service* (1988 Catalogue).

National Board of Boiler and Pressure Vessel Inspectors, *Pressure Relieving Device Certifications*, pp. 313–315, 1979.

O. G. Tietjens, *Applied Hydro and Aeromechanics* (1934), pp. 144–156.

R. Bisplinghoff and H. Ashley, *Principles of Aeroelasticity* (1962), pp. 201, 202, and 217.

*Primary Examiner*—John Rivell

[57] ABSTRACT

A safety and pressure relief valve has a seat at the end of a nozzle, a disk which is axially movable from a closed seat-engaging position to an open position, and a sleeve which is telescopically slidable relative to the disk to define variable orifices downstream of the seat and disk. When the valve initially opens, a flow force characteristic having relatively large slope begins the lift movement of the disk. Immediately after opening, an internal pressure related movement of the diskholder relative to the disk occurs to thereby changes the flow path. The valve performs further opening, discharging and closing sequences with the shifted flowpath. Before reseating, the diskholder regains its initial position relative to the disk. In one embodiment, the disk, nozzle and sleeve are mounted in a cartridge assembly which is detachably connected to a valve bowl or body.

43 Claims, 20 Drawing Sheets

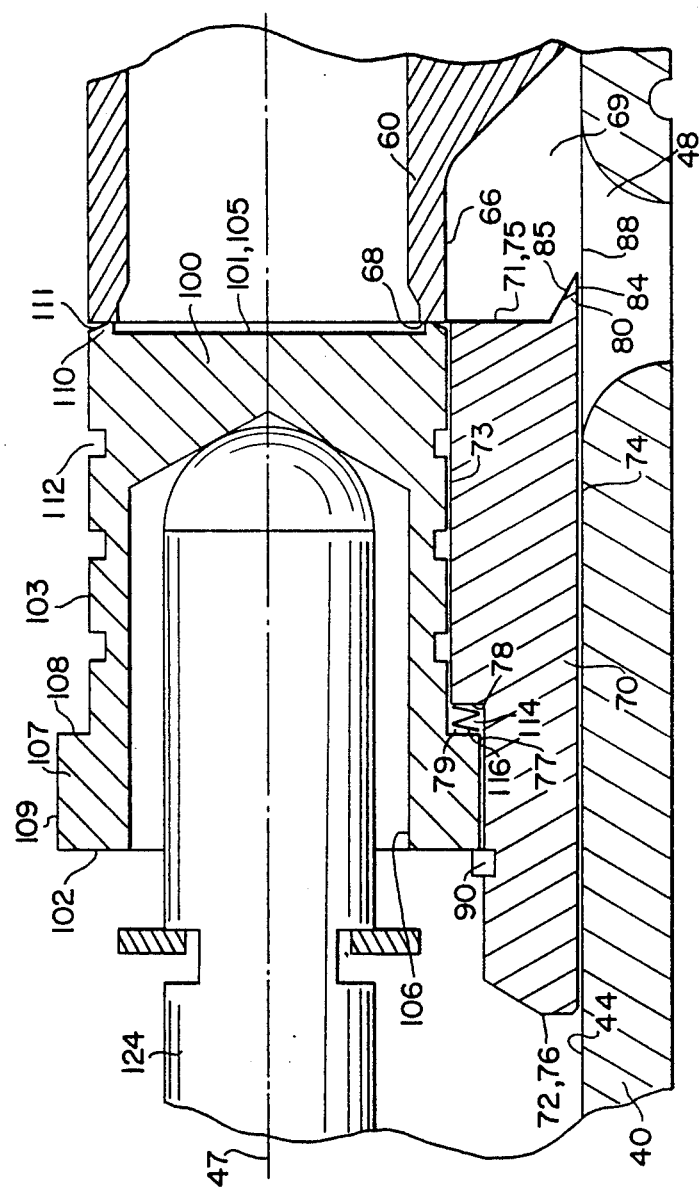

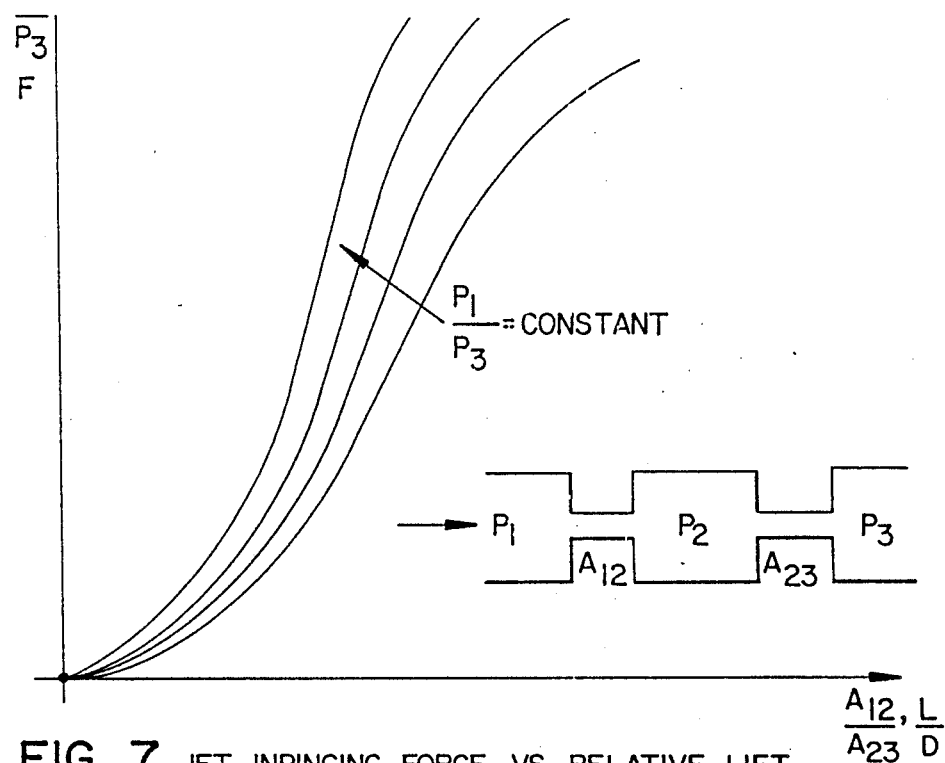
FIG. 7. JET INPINGING FORCE VS. RELATIVE LIFT
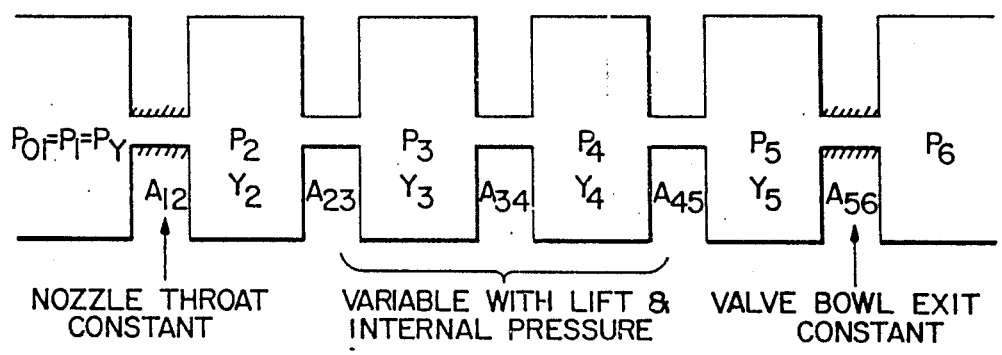
FIG. 8A. FIVE ORIFICES IN SERIES VALVE MODEL

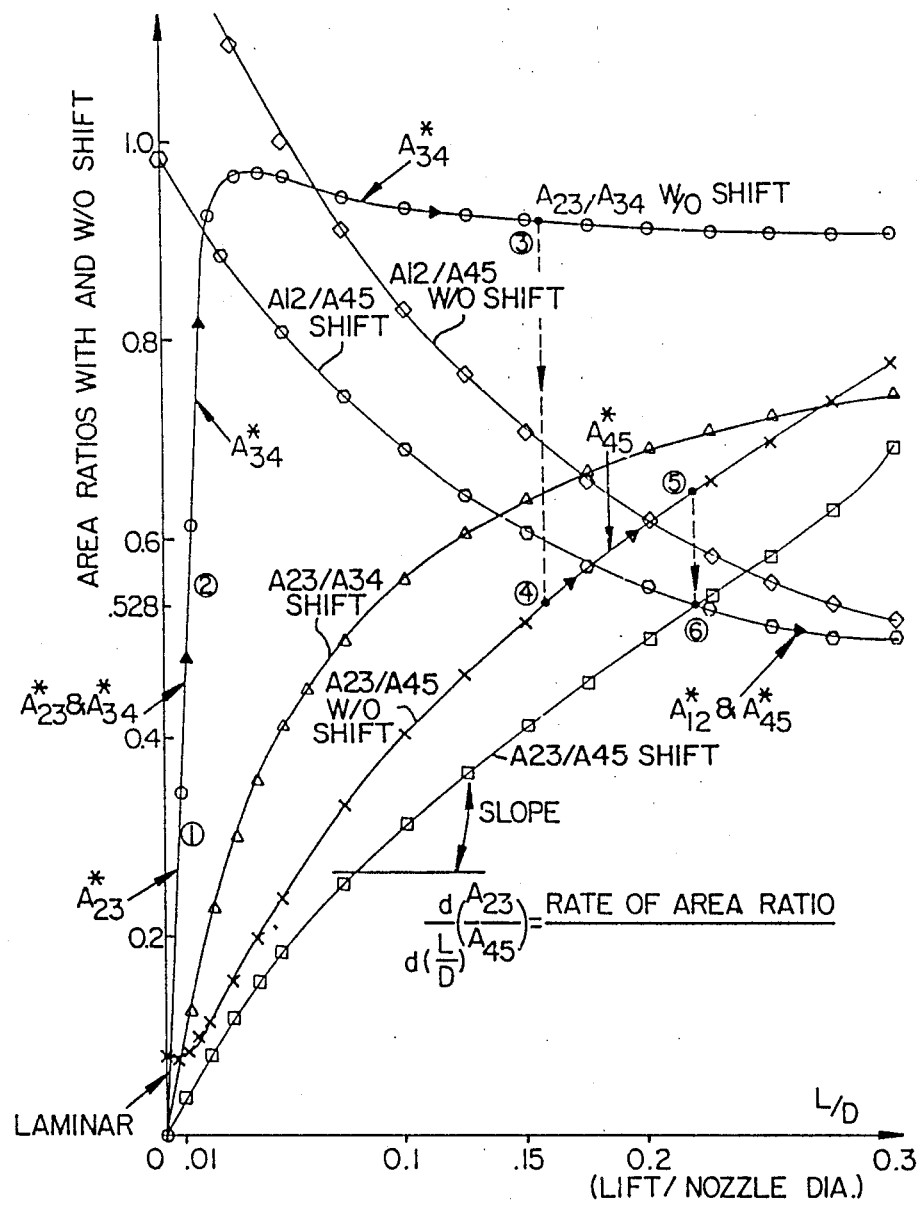
FIG. 8B  G-2 FLOWPATH FLOW CONTROLLING AREA RATIO VS. RELATIVE LIFT

1 DEGREE OF FREEDOM PRESSURE RELIEF VALVE

2 DEGREE OF FREEDOM PRESSURE RELIEF VALVE

FORCE RESULTANT (ACTING ON VALVE STEM)
CONSTANT VESSEL PRESSURE AND FIXED RELATIVE LIFT

FIG. 21 VALVE OPERATION SCHEMATIC

FIG.22 h-s DIAGRAM COMPARING THE STANDARD VALVE PROCESS TO THE G-2 INVENTION PROCESS

CARTRIDGE-TYPE DIRECT LOADED SAFETY AND PRESSURE-RELIEF VALVE HAVING FLOW PATH FOR PREVENTING SUPERSONIC FLOW AND MINIMIZING VALVE HYSTERESIS

FIELD OF THE INVENTION

The invention pertains to a direct loaded safety and pressure relief valve. More particularly, the invention pertains to a direct loaded safety and pressure relief valve having a flow path which prevents supersonic flow under the moving parts in the valve and minimizes the valves lift vs. pressure hysteresis characteristic.

BACKGROUND OF THE INVENTION

A typical safety and pressure relief valve is designed on the basis of a convergent-divergent nozzle flow concept. At full lift, i.e. where the distance between the valve poppet and the valve seat is maximum, the flow-controlling cross sectional area is the minimum cross-sectional area of a convergent nozzle positioned upstream of the seat. Thus, choking occurs inside the throat of the convergent nozzle, and a supersonic flow field (Mach > 1.0), including shock waves, via radial pressure distributions, actuates the valve poppet or disk and maintains it open during the discharge of the fluid.

This typical safety and pressure relief valve produces a non steady flow which causes popping action of safety and the moving parts at set pressure and hysteresis of the lifting forces versus the vessel pressure. Furthermore, the opening forces at the same vessel pressure are greater during valve closing than during valve opening.

In an attempt to control the popping action of safety and pressure valves, some manufacturers have incorporated "huddling chambers" in various valves. This valve design leads to the following problems:

different categories and series of valves have parts which differ geometrically depending on the type of fluid (e.g. gas, steam or liquid), admissible overpressure and blowdown values;

the parts for each valve size within a series are usable only with a completely assembled valve;

valves are large relative to nozzle bore size due to fluid expansion which results in a supersonic flow field during lifting of the valve;

one to three adjustable rings within the valve need manual adjustments in order to satisfy valve performance requirements;

pressure ranges are limited for any given spring rate, for example the pressure range in which a required performance can be obtained with a particular adjustment;

valves must be set and adjusted on flow test rigs due to the intrinsic interdependence of the popping pressure and blowdown value, as adjustment of the blowdown changes the set (popping) pressure without any change in the spring load;

valve stability is reduced due to a flowforce vs. lift (at constant vessel pressure) having slope sign changes, low damping factors and non-steady transonic flowfield with shocks under the moving parts;

large valve bowl volumes are required in order to increase the fill-up time and avoid simultaneous valve bowl pressure increases upon sudden opening of the valve;

choking can occur in the valve bowl exit orifice, thereby increasing the pressure acting in the closing direction on top of the moving parts and thus reducing the discharge capacity and stability of the valve; and inlet and outlet headers reduce the valve performance to an extent requiring strict installation limitations.

SUMMARY OF THE INVENTION

The safety and pressure relief valve of the invention has a flow path which has a new operational sequence and location of mass flow rate and internal pressure controlling cross-sectional areas. The invention is applied to a new generation of safety and pressure relief valve series which are independent of valve size, fluid type, pressure domain, overpressure and blowdown requirements or lift and vessel pressure characteristics.

Prior safety and pressure relief valves typically function with a unilateral lift movement (one degree of Freedom) which varies while the valve is open, i.e. the lift distance L between the disk/poppet and the seat at the end of the nozzle varies while the valve is open. On the other hand, the present invention has variable dual movements (two degrees of Freedom), including: (1) a first lift movement L, and (2) a second shift movement S.

The geometry of the flow path changes with the lift of the valve and the local pressure of the internal flow. At full lift under quasi-steady flow conditions, the pressure relieving process occurs via:

(1) an acceleration through the convergent nozzle;
(2) a pressure recovery sufficient to maintain a subsonic flow field under the moving parts; and
(3) a sonic discharge.

For lift values (L) larger or equal to one-fourth of the nozzle throat diameter (D/4), choking occurs inside the convergent nozzle and in the region of the radial exit holes. The growth of the boundary layer's thickness during the quasisteady discharge flow of the fluid determines the desired minimum hysteresis of the valve. The ratio and location of the flow-controlling area changes with the lift and local internal pressure. The flow path changes during the initial opening phase of the valve, remains shifted at full lift and during closing of the valve and re-shifts finally to regain initial geometry. Thus, the present invention is self-adjusting to minimize valve hysteresis, whereas prior art valves need fixed geometrical adjustments.

Due to several factors including a modified flow field, internal pressure and temperature distributions at different relative lift and shift values, and a variety of cartridge constructions, the flow path can be applied to compressible as well as incompressible fluids, including multi-phase fluids and cryogenic fluids, to obtain improved pressure relief valve performance.

BRIEF DESCRIPTION OF THE DRAWINGS

FIGS. 1-25 show a safety and pressure relief valve having flow paths in accordance with the invention.

FIG. 1 is a sectional view of the valve.

FIG. 2 is a detail view of the moving and non-moving parts of the valve generating the flow path.

FIG. 3 is a detail view of a wave spring stack.

FIG. 4 is a detail view showing the valve components which provide four-orifices-in-series (the fifth is the valve exit).

FIG. 5 shows a theoretical model in which two orifices are arranged in series.

FIG. 6 is a graph, on a double logarithmic scale, showing overall pressure ratios as a function of orifice area ratios.

FIG. 7 is a diagram which shows a impinging force versus relative lift.

FIG. 8a is a model diagram which shows a five orifices in series valve model.

FIG. 8b is a diagram showing the flow-controlling area ratios versus the relative lift of the valve's flow path.

FIGS. 9–17 are detail theoretical views of the valve showing a sequential series of lifts.

FIG. 18 shows a model of a one degree of Freedom valve.

FIG. 19 shows a model of a two-degree of Freedom valve.

FIG. 20 shows the force vs. relative lift and constant vessel pressure.

FIG. 21 is the valve operation schematic.

FIG. 22 is an enthalpy versus entropy diagram.

FIG. 23 shows a second embodiment of the invention.

FIG. 25 shows a bellows balanced valve.

DETAILED DESCRIPTION OF THE INVENTION

Figure 1:
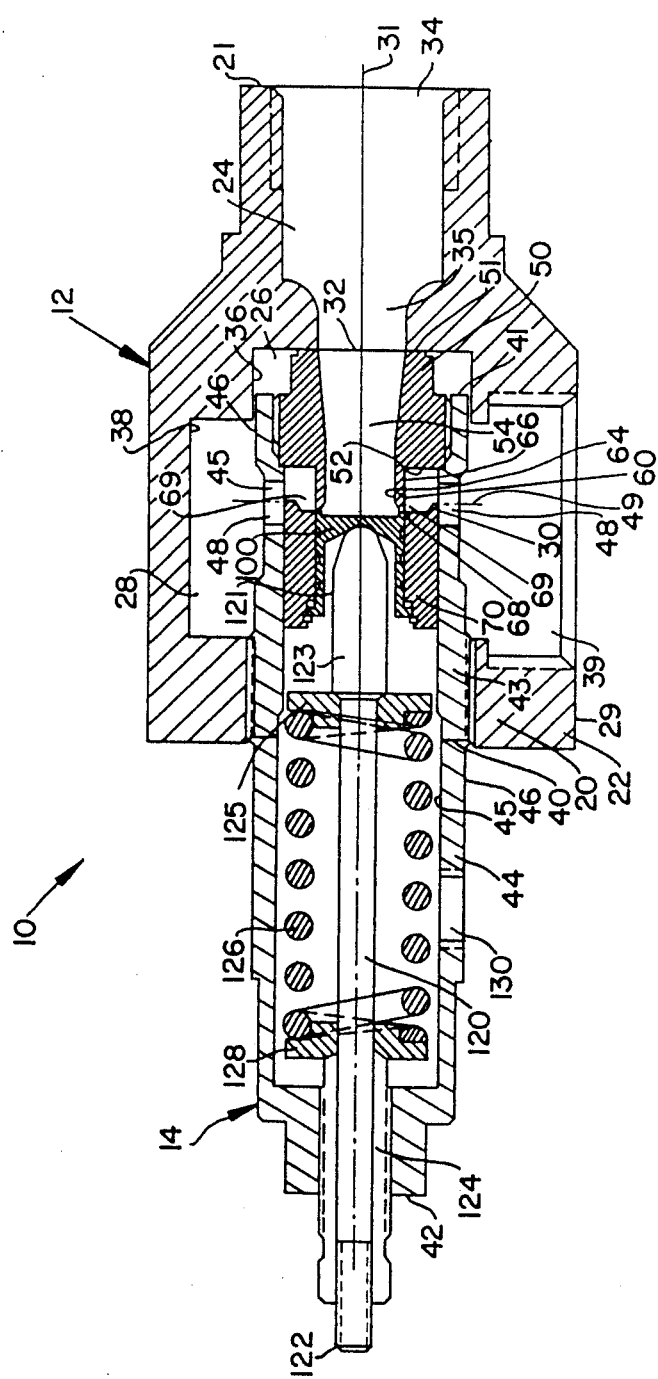

FIG. 1 shows a safety and pressure-relief valve assembly 10 comprising a valve bowl 12 and a valve cartridge 14. The valve bowl 12 is adapted to be connected to a pressure system. The valve cartridge 14 is adapted to be inserted into the valve bowl 12.

The valve bowl 12 comprises a hollow-cylindrical body 20 having a first axial end 21 and a second axial end 22. The bowl defines a high-pressure fluid inlet chamber 24, a chamber 26, and a low pressure fluid outlet chamber 28. The cartridge 14 is threaded into the body 20 for controlling the flow from the inlet chamber 24 to the outlet chamber 28.

The high pressure inlet chamber 24 includes an upstream end 31 and a downstream end 32. It has a cylindrical fluid passage 34 extending axially from the upstream end 31, and a frustoconical fluid passage 35 extending axially from the end of the cylindrical fluid passage 34 and tapering diametrically toward the downstream end 32. The chamber 26 has a cylindrical bore 36 which extends axially from the end 22 of body 20 to the downstream end 32 of the inlet chamber 24. The outlet chamber 28 has a cylindrical fluid passage 38 which is coaxial with the cylindrical valve passage 36, and is radially larger and axially smaller than the valve passage 36. A cylindrical fluid outlet opening 39 extends radially from the fluid passage 38 to the outer surface 29 of the body 20.

The valve cartridge 14 includes a hollow-cylindrical cartridge body 40 with a first axial end 41 and a second axial end 42. The portion of the cartridge proximate the first end 41 is a guide 43 having a chamber for housing moving parts of the valve, and the portion of the cartridge proximate the second axial end 42 is a bonnet 44 having a chamber for housing the biasing mechanism of the valve. Together the guide 43 and the bonnet 44 define a cylindrical inner surface 45 and a cylindrical outer surface 46. At least one fluid exit opening 48 is provided in the guide portion 43 of the cartridge body 40. The central axis 49 of the guide exit opening 48 is transverse to the central axis 47 of the cartridge 40.

A nozzle 50 is threaded into the end 41 of the cartridge 40. The nozzle 50 has an upstream end 51 and a downstream end 52, and it has a frustoconical fluid passage 54 tapering diametrically from the upstream end 51 to a throat near the downstream end 52. The upstream end 51 of the nozzle 50 is at the downstream end 32 of the inlet chamber 24 such that the fluid passages 34, 35 and 54 form a leak tight convergent nozzle.

The fluid exit openings 48, have a total area of 1.65 to 2.2 times the minimum area of the convergent nozzle 34, 35, 54. The exit openings 48 can be any shape, for example, circular, rectangular, triangular, etc.

The valve seat portion 60 is formed at the downstream end 52 of the nozzle 50. The seat portion 60 is a relatively thin cylindrical wall with an inner surface 64, a cylindrical outer surface 66 and an annular seat surface 68. The diameter of the cylindrical outer surface 66 is approximately one-half the diameter of the inner surface 44 of the guide 43 to form a pressure recovery chamber 69 between the guide 43 and the outer surface 66 of the nozzle 50. The plane of seat 60 intersects the openings 48, and the seat 68 is positioned upstream of the point at which the central axes 49 of the openings 48 intersect with the central axis of the guide 43.

FIGS. 1 and 2 show a diskholder 70 telescopically positioned in the cartridge 40. The diskholder 70 is a hollow cylinder having a first axial end 71 and a second axial end 72. The diskholder 70 has a cylindrical inner surface 73, a cylindrical outer surface 74, and end surfaces 75 and 76. The diameter of the outer surface 74 of the diskholder 70 corresponds substantially to the diameter of the inner surface 44 of the guide 43 such that the diskholder 70 slides telescopically in the guide 43. The diameter of the inner surface 73 corresponds substantially to the diameter of the outer surface 66 of &he seat portion 60.

A counterbore 77 is provided at the end 72 of the diskholder. It provides a shoulder surface 78 around the inner surface 73 of the diskholder 70. The shoulder surface 78 faces the end 72 of the diskholder 70. An annular space 79 is formed between the inner surface of the counterbore 77, annularly around the outer circumference of the shoulder surface 78 of the diskholder 70, and the shoulder surface 108 and the outer surface of the disk 100. The skirt 80 defines an outer surface 84 extending continuously from the outer surface 74 of the diskholder 70, and an inner surface 85 tapering diametrically away from the shoulder surface 75 toward the outer surface 74 of the skirt 80.

The valve disk 100 is concentrically positioned within the diskholder 70. The disk 100 is a solid cylinder having a first axial end 101 and a second axial end 102. The disk 100 has a cylindrical outer surface 103, a planar end surface 105 at the end 101, and a cylindrical bore 106 at the end 102. The bore 106 extends axially from the end 102 toward the end 101 to a point more than the half length but less than the full length of the disk 100. The diameter of the outer surface 103 of the disk 100 corresponds substantially to the diameter of the inner surface 73 of the diskholder 70 and to the diameter of the outer surface 66 of the seat portion 60.

A flange 107 is provided around the outer surface 103 and proximate the end 102 of the disk 100. The flange 107 has a shoulder surface 108 facing toward the shoulder surface 78 of the diskholder 70. The outer surface 109 of the flange 107 has a diameter greater than the diameter of the inner surface 73, but slightly less than the diameter of the counterbore 77 of the diskholder 70.

At its upstream end, the disk has a lip 110 which extends axially from and annularly around the circumference of the planar surface 105. The lip 110 has an oblique annular end surface 111 adapted to abut against the annular seat 68 of the seat portion 60.

A plurality of circumferential grooves 114 are formed in the cylindrical outer surface 103 of the disk 100.

The diskholder 70 is shiftably retained on the disk 100. The flange 107 of the disk 100 sits between the shoulder surface 78 and the clip 90 in the diskholder 70. The predetermined distance between the shoulder surface 78 and the clip 90 of the diskholder 70 is greater than the distance between the shoulder surface 108 and the end 102 of the disk 100. Due to the unequal distances, there is a shift space 114 between the shoulder surface 78 of the diskholder 70 and the shoulder surface 108 of the disk 100.

Figure 3B:
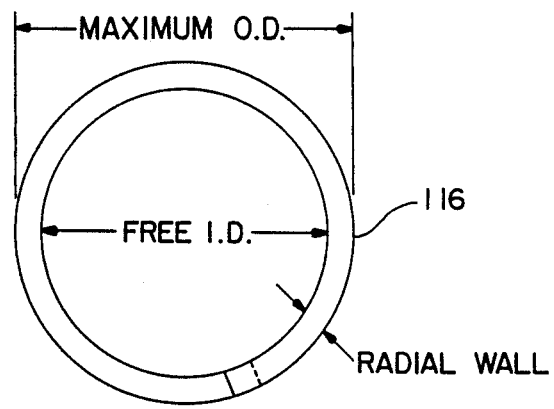
Figure 3A:
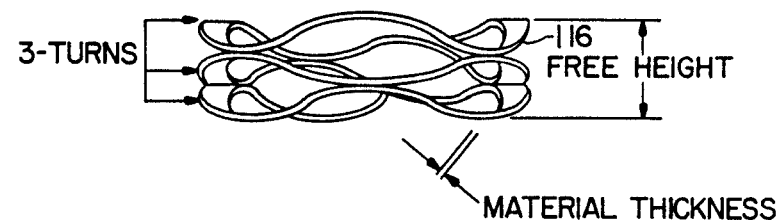

FIGS. 2 and 3 show a stack 116 of wave springs positioned within the shift space 114. The wave springs 116 bias the diskholder 70 toward the first axial end 101 of the disk 100 such that the clip 90 of the diskholder 70 abuts against the second axial end 102 of the disk 100. In the biased position, the first end surface 75 at the end 71 of the diskholder 70 sits substantially flush or below the annular lapped end surface 111 at the end 101 of the disk 100 and annular seat surface 68 of nozzle 50.

The pressure recovery chamber 69 is defined radially between the outer surface 66 of the seat portion 60 and the inner surface 44 of the guide 43, and it lies axially between the end surface 75 of the diskholder 70 and the downstream end surface 52 of the nozzle 50. The guide exit openings 48 are located between the quasi toroidal pressure recovery chamber 69 within the guide 43 and the outlet chamber 28 within the body 20.

An axially-extending rod 120 is provided in the bonnet portion 44 of cartridge 40 for biasing the disk 100. The rod 120 includes a first axial end 121 and a second end 122. The first end 121 is provided with an enlarged portion 124, and the second end 122 is slidably-inserted through a spring-adjusting nut 124 which is threaded to the end 42 of the bonnet 44. A helical compression spring 126 is mounted around the rod 120 between a first spring button 125 which is mounted adjacent the enlarged portion 123 and a second spring button 128 which is mounted adjacent the spring adjusting nut 124. One end of the spring 126 is connected to the spring button 125, and a the other end of the spring 126 is connected to the spring button 128.

The end 121 of the rod 120 is provided with a convexly-rounded portion. The spring 126 biases the convexly-rounded portion of the rod 120 against the disk 100 which, in turn, is biased to a closed position against the annular seat 68 of the seat portion 60. In the closed position, the end surface 75 of the diskholder 70 sits approximately flush or below the annular end surfaces 68 and 111, respectively, of the seat portion 60 and disk 100, and the annular end surface 88 of the skirt 80 is positioned approximately at the central axis 49 of the guide exit holes 48 in the guide 43.

Figure 4:
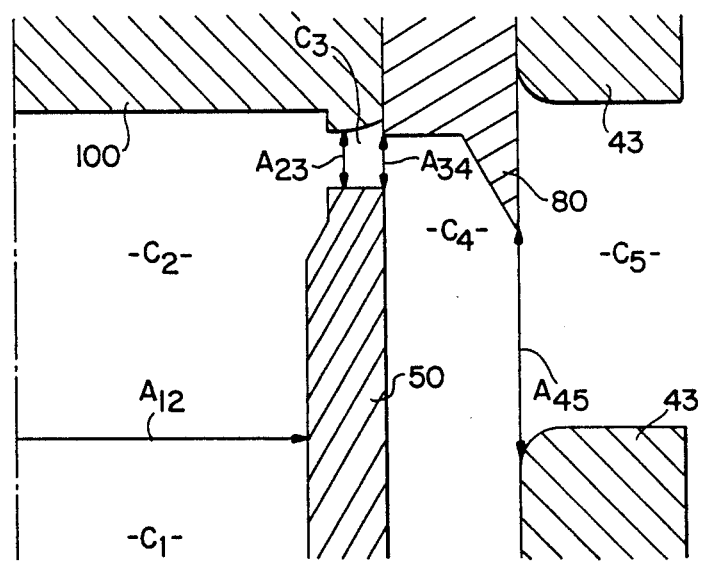

FIG. 4 shows the flow path components that control the choking surface and prevent supersonic flow under the valve's moving parts, i.e. the disk 100 and the diskholder 70. In FIG. 4 the disk 100 has lifted a distance L off the seat 50, and the diskholder 70 is still at its initial position relative to the disk, prior to its upward shift. Thus, both the disk 100 and the diskholder 70 are moved in an opening direction by the distance L.

The flowpath in FIG. 4 can be viewed as a series of orifices in flow direction which interconnect and define a series of chambers through which a fluid particle must pass. The fluid particle flows sequentially through the nozzle chamber C1 which has a diameter D and the orifice $A_{12}$ the orifice $A_{23}$, the chamber C3 between the seat 50, disk 100 and diskholder 70, the orifice $A_{34}$, the chamber C4 within the guide 43, the orifice $A_{45}$ through the guide 43, and the chamber C5 which is in communication with the low pressure fluid outlet chamber 28.

The ability of the skirt 80 to shift relative to the disk 100 is important because, as will be described below, it permits the orifices $A_{34}$ and $A_{45}$ to change in a way which will prevent internal supersonic flow and will relocate the surface where choking occurs in the flowpath of the escaping fluid. By relocating the surface where choking occurs, it changes the wall pressure distribution of the moving parts and thus the force.

Figure 5:
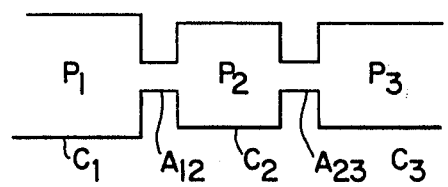
Figure 6:
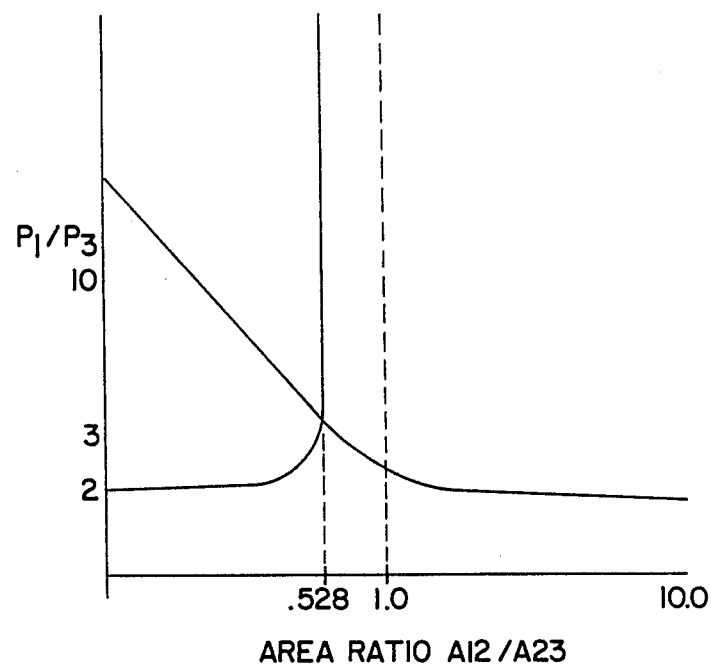

FIGS. 5, 6, 7, 8a and 8b provide a theoretical explanation of the fluid dynamic aspects of the invention. FIGS. 5, 6 and 7 show the known characteristics of an ideal gas flowing through a two orifice series; and, FIGS. 8a and 8b show the theoretical flow model through a five orifice flowpath as exists in this invention.

FIG. 6 shows a two-orifices-in series valve model providing four regions of flow which are area ratio related and overall pressure ratio related. Two-orifices-in series models can be used to model a simplified prior art valve operation where $P_1$ is the approximate vessel pressure, $P_2$ is the average pressure under the moving parts and $P_3$ is a constant valve bowl pressure, e.g. atmospheric pressure. The average pressure $P_2$ multiplied by the area on which $P_2$ acts will yield the approximate lifting force acting on the moving parts. The gas flows serially through chamber C1, orifice $A_{12}$, chamber C2, orifice $A_{23}$, and chamber C3. The quantities $P_1$, $P_2$ and $P_3$ are the pressures in the respective chambers C1, C2, and C3.

As shown in FIG. 6, for ideal gas, the overall pressure ratio $P_1/P_3$ is a function of the area ratio $A_{12}/A_{23}$. At low values of $A_{12}/A_{23}$, choking occurs in the orifice $A_{12}$, but when this ratio is greater than 0.528 and the pressure ratios $P_1/P_3$ are greater than 2.0, choking occurs in the downstream orifice $A_{23}$ which thus controls the mass flow rate and $P_2$. Note that for significant pressure ratio ranges $P_1/P_3=2$ to 100, there is a domain between $A_{12}/A_{23}=0.528$ to 1 where the large orifice $A_{23}$ is choking.

FIG. 7 shows, for the model of FIG. 5, the "S-curves" for the intermediate pressure ratio $P_2/P_3$ versus the area ratio $A_{12}/A_{23}$ at constant overall pressure ratios ($P_1/P_3$=constant) for an ideal gas. The area ratio $A_{12}/A_{23}$ can be correlated to the dimensionless relative lift $L/D$ in which L is the lift measured in an axial direction and D is the nozzle diameter measured in a radial direction. Thus, the S-curves represent the lifting force acting on the moving parts as a function of the relative lift at constant overall pressure ratio $P_1/P_3$ or (constant vessel pressure $P_1$ if $P_3$ is atmospheric).

FIG. 8a shows a simplified model of a one dimensional flow through five-orifices-in-series. The first and last orifices have a constant area while the remainder of the orifices have areas which vary with the lift and with the internal pressure. The orifices in this model correspond theoretically to orifices that are in a valve constructed according to the invention.

FIG. 4 shows the approximate shapes and locations of the first four-orifices-in-series in flow direction of the valve assembly 10 shown in FIGS. 1 and 2, corresponding to the five-orifice-in-series of the model shown in FIG. 8a. The last fifth orifice is the constant valve exit orifice 39 in FIG. 1. The actual orifice areas during lift are approximated by the following:

$A_{12}$ is the constant minimum cross-sectional area of the nozzle passage 54;

$A_{23}$ is the variable curtain area at a mean diameter between the annular seat 68 and the annular end surface 111 of the disk 100;

$A_{34}$ is the variable curtain area generated by the rotation of the distance between the intersection of the outer diameter of the nozzle seat 68 with the cylindrical surface 66 and the intersection of the inner diameter of the diskholder 70 with the end 71 around the centerline 47 of the valve;

$A_{45}$ is the variable area consisting of the area of the sum of the guide exit openings 48 minus the area of the portion of the diskholder 70 which obstructs the openings 48; and $A_{56}$ is the area of the exit hole 39 in the valve body 20.

The last significant orifice area $A_{45}$ is variable with the valve lift and internal pressure, and it increases with increasing lift until it equals the sum of the guide exit hole areas 48. Thus, the slope of the area $A_{45}$ vs. lift is always positive. Essentially, the flow passage is in radial axial directions with periodic symmetry. If six guide exit holes are considered, the flow domain is 360 degrees divided by 6 to equal a 60 degree periodical.

FIG. 8b shows the significant flow-controlling area ratios versus relative lifts (L/D) of the valve, based on sequential sets of instantaneous theoretical flow path frames at different relative lift values during a full operating cycle of the valve. Due to the sudden acceleration of the moving parts during popping, within 10 to 50 millisecond pressure and fluid dependent, the boundary layer has no time to grow. Thus, approximations of the geometric areas and geometric area ratios control the flow during the opening of the valve.

Figure 9:
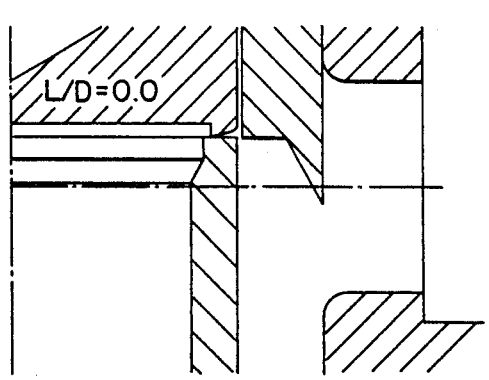

FIG. 9 shows the flow path closed so L/D=0. Immediately after contact is lost between the seat 68 and the disk 100, laminar and then turbulent flow is established for an increased lift. The location of the choking surface within the flow path is an approximation of the radial penetration of the time dependent vessel pressure.

Figure 10:
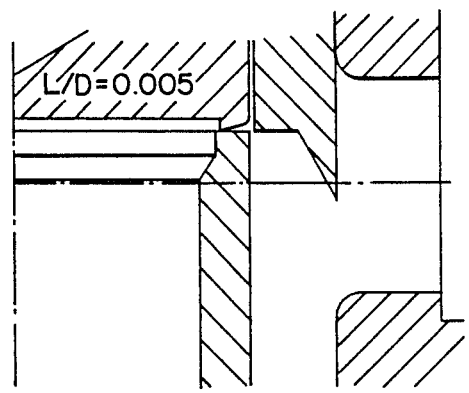

FIG. 10 shows the flow path during valve opening at L/D=0.005 where the flow controlling orifices are areas $A_{23}$ and $A_{34}$. At this instant, the area ratio $A_{23}/A_{34}$ and the pressure ratio $P_1/P_3$ indicate an operating point in the domain of FIG. 4 where the first orifice is choked. In FIG. 8 choking of orifice $A_{23}$ is shown by the segment 0-1 on curve $A_{23}/A_{34}$.

Figure 11:
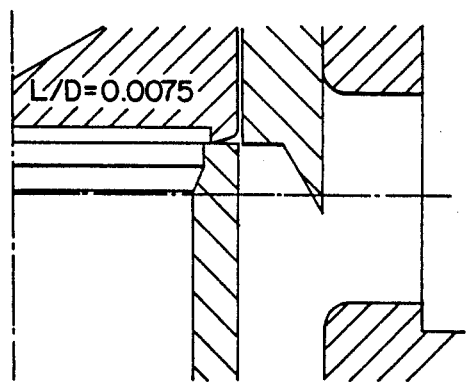

FIG. 11 shows the flow path at L/D=0.0075 where the flow controlling orifices are still areas $A_{23}$ and $A_{34}$. However, the pressure ratio and the area ratio have increased, and the operating point is now inside the domain corresponding to the range in FIG. 4 where both orifices are choked. In FIG. 8, choking of orifices $A_{23}$ and $A_{34}$ is shown by the segment 1-2 on curve $A_{23}/A_{34}$.

Figure 12:
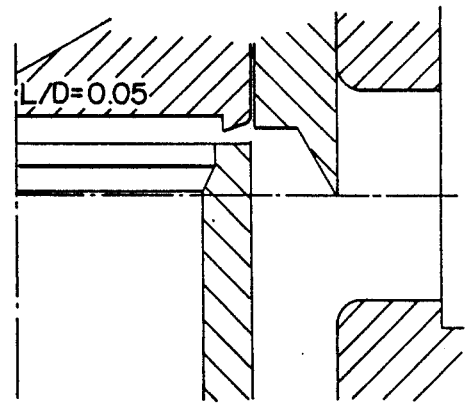

FIG. 12 shows the flow path at L/D=0.05 where the flow controlling orifices are areas $A_{23}$ and $A_{34}$. The operating point has now moved across the vertical at area ratio $A_{23}/A_{34}=0.528$ of FIG. 4 and into the domain where the second orifice $A_{34}$ is choked. In FIG. 8, choking of orifice $A_{34}$ is shown by the segment 2-3 on curve $A_{23}/A_{34}$. The sudden increase in radial area on which the vessel pressure acts causes the sudden increase in the lifting force, and thereby produces sudden acceleration of the moving parts so the disk and diskholder start to move with the same acceleration and speed.

Figure 13:
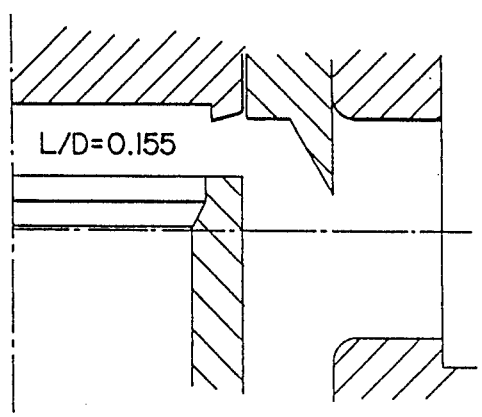

FIG. 13 shows the flow path at L/D=0.155 where the significant flow controlling orifices now become areas $A_{34}$ and $A_{45}$. As shown in FIG. 8, the area ratio $A_{34}/A_{45}$ increases as the valve opens further, and the operating point now moves to the flow controlling area ratio $A_{34}/A_{45}$ (without shift). The area $A_{45}$ chokes as the area ratio becomes larger than 0.528. Due to increasing mass flux and choking of the fluid by the guide exit openings 48, the pressure rises within the chamber 69 formed between the guide 43, nozzle 50, seat portion 60 and diskholder 70, and the operating point moves along the segment 4-5 of the curve $A_{34}/A_{45}$ in FIG. 8. While the disk 100 and diskholder 70 are in motion and accelerating at the same rate, the increasing pressure under the diskholder 70 eventually overcomes the frictional force and wave spring force 116. The force of the wave springs 116 and the fluid force acting on the diskholder 70 get out of balance and an increased acceleration "shifts" the diskholder 70 relative to the moving disk 100 Since the disk 100 is loaded by the rod 120 and spring 126 while the diskholder 70 is not, the diskholder shifts axially on the disk to change the flow path which now governs the flow. This changed and charging flow path is described herein as being "with shift."

Figure 14:
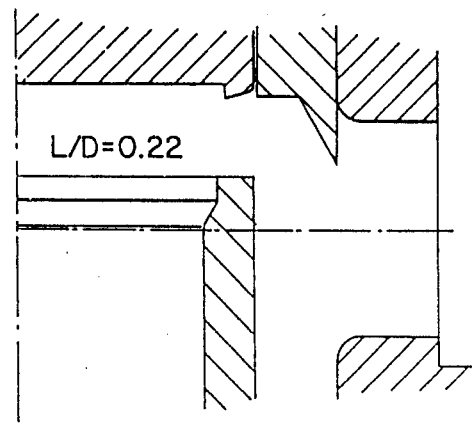

FIG. 14 shows the flow path at L/D=0.22 before shift. Between the theoretical relative lifts of 0.155 and 0.22 a relative shift of approximately 0.06 D occurs. The shift eliminates the area $A_{34}$ as a flow-controlling significant area. Thus, referring to FIG. 8, the operating point moves along segment 5-6 on the curve $A_{12}/A_{45}$ with shift. The guide exit area $A_{45}$ and the area $A_{12}$ chokes and controls the flow.

Figure 15:
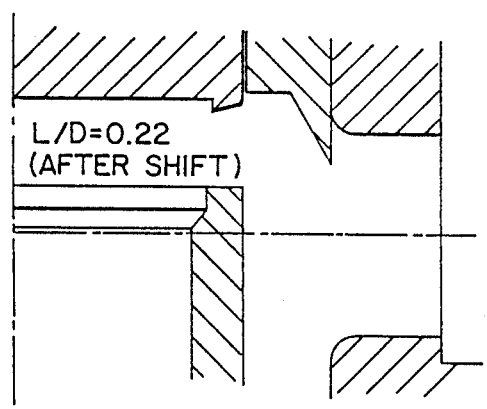

FIG. 15 shows the flow path at L/D=0.02 after shift. The shoulder surface 108 on the disk 100 prevents further relative upward movement of the diskholder 70.

The L/D values given in FIGS. 9 to 17 are theoretical and magnified for graphic explanation reasons. Test results on gases indicate that L/D values of approximately 0.02 at which shifting occurs are achievable depending on secondary (wave spring) rate $R_2$, its set load and valve geometry.

Figure 16:
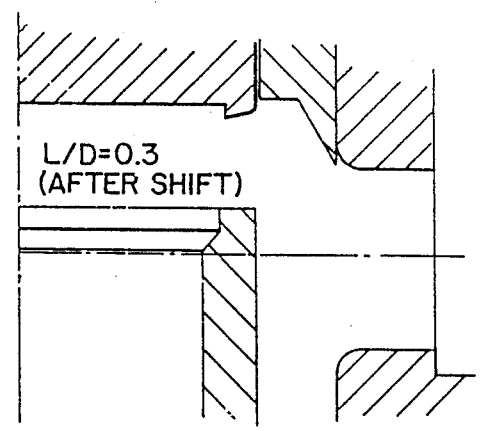

FIG. 16 shows the flow path at L/D=0.3 after shift. At values of approximately 0.528 or less for area ratio $A_{12}/A_{45}$, both flow controlling orifices $A_{12}$ and $A_{45}$ are choked and admit the maximum specific mass flux. In FIG. 8 this corresponds to segment 6-7 on the curve $A_{12}/A_{45}$.

The opening step of the valve operation cycle is now complete and the valve achieves its maximum discharge capacity.

At full lift, flow is quasi-steady. During this state of quasi steady flow, the boundary layers including flow detachments have the required time to grow and establish themselves. At this point, the purely geometric approximations of the flow controlling orifice areas becomes inaccurate due to the substantial impact of the boundary layer thickness.

FIG. 16 also depicts the flow path during valve closing at L/D=0.3 after shift. As indicated in FIG. 8, the boundary layer decreases the passage area inside the nozzle 50 from $A_{12}$ to $A_{12}'$; between the seat 68 and disk 100 from $A_{23}$ to $A_{23}'$; and inside the guide exit openings 48 from $A_{45}$ to $A_{45}'$. The area ratios change in a like manner.

Figure 17:
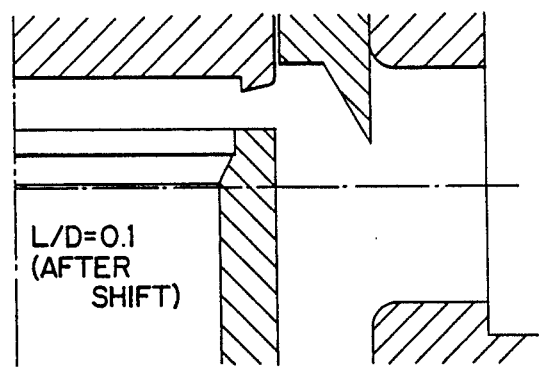

FIG. 17 shows the flow path at L/D=0.1 after shift. Due to the shift and pressure within the guide 43 and under the diskholder 70, the flow path continues to stay shifted during valve closing. Thus, the area $A_{34}'$ is not a significant flow area during the decreasing relative lift of the moving parts. As the pressure ratio of vessel pressure to valve bowl pressure decreases, the significant flow controlling area ratio $A_{23}'/A_{45}'$ also decreases, and choking first occurs at both orifices $A_{23}'$ and $A_{45}'$. Eventually, area $A_{45}'$ unchokes and only area $A_{23}'$ is choked. Because the shift and the boundary layers produce a different flow path during the decreasing relative lift, the integral of the pressure with respect to the radius and polar angle on the moving parts is less than without the shift, but larger than during pop at the same vessel pressure.

The valve slams shut because the radial extension of the area on which the vessel pressure acts is less during closing than during pop at this lift,, i.e. $A_{23}'$ controls instead of $A_{34}'$. Finally, the diskholder 70 returns to its initial position to complete the cycle due to the now larger wave spring force than the flow force on the diskholder.

The frame sequences of the flow controlling orifices is in principle the same for liquids as for gases, but choking does not occur for liquids. Furthermore, with gases and liquids, the guide exit openings 48 act as orifice dampers. Thus, a valve having the flow path of the invention is provided with an improved adjustable, dynamic stability The stability is adjustable by decreasing the guide exit opening 48.

Figure 18:
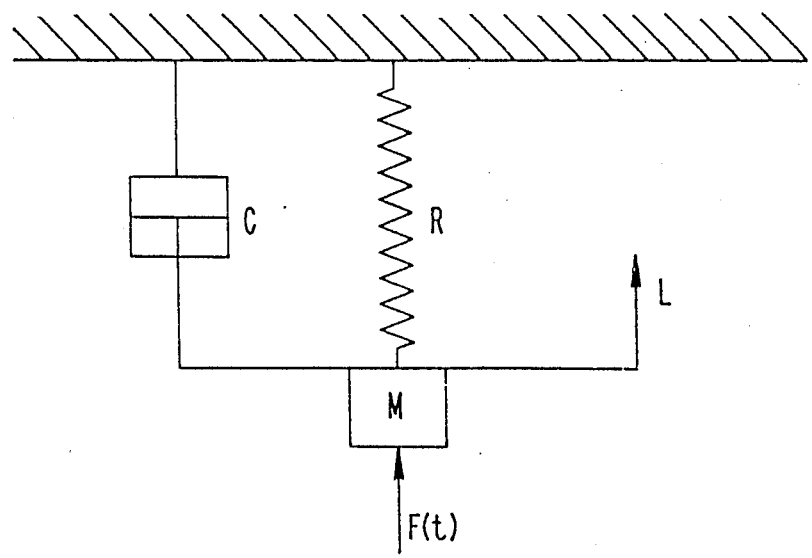
Figure 19:
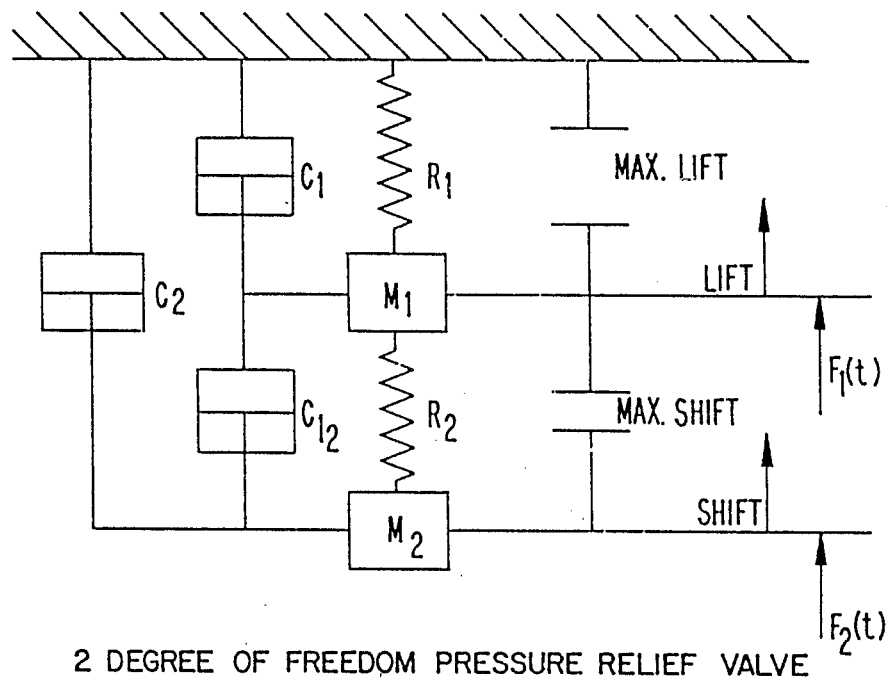

Lift is the actual travel of the disk from closed position to the position reached when the valve is at flow rating pressure. Shift is the actual travel of the diskholder relative to the disk FIG. 18, shows how prior-art safety and pressure relief valves function as a forced spring-mass system having a unilateral movement corresponding to the valve's lift. FIG. 19 shows how the present invention functions as a spring-mass system having a dual movement. In addition to a first lift movement, the present invention has a second shift movement for valve performance reasons.

Referring to FIG. 19, a mass $M_1$, representing the sum of the mass of all the moving parts except the diskholder and the wave spring, is connected by a preloaded main spring having a rate $R_1$, and an equivalent dashpot, having an equivalent damping factor $c_1$, to the fixed valve structure. The travel of any point of the disk (essentially $m_1$) is the lift. The mass $m_2$, representing the diskholder and the wave spring, is connected via a preloaded additional elastic element (e.g a wave spring), having a rate $R_2$, to the mass $m_1$. Equivalent damping factors $c_{12}$ and $c_2$ model the damping between the diskholder and the disk called shift, as well as the damping between the diskholder and the guide.

The time-dependent force $F_1$ is the integral of the fluid pressure over the disk area. The time dependent force $F_2$ is the integral of the fluid pressure over the annular diskholder area. The force $F_2$ is added to $F_1$, thus the valve stem is subjected to $F_1$ and $F_2$. The sum of $F_1$ and $F_2$ is the forcing term acting against the main spring ($R_1$) producing lift. $F_2$ is the force acting against the secondary (wave) spring having the spring rate $R_2$ and producing the movement of diskholder relative to the disk called shift, as well as contributing to the lift generating total force $F_1$ and $F_2$. The shift, the relative movement of the diskholder relative to the disk, is mechanically limited.

Figure 20:
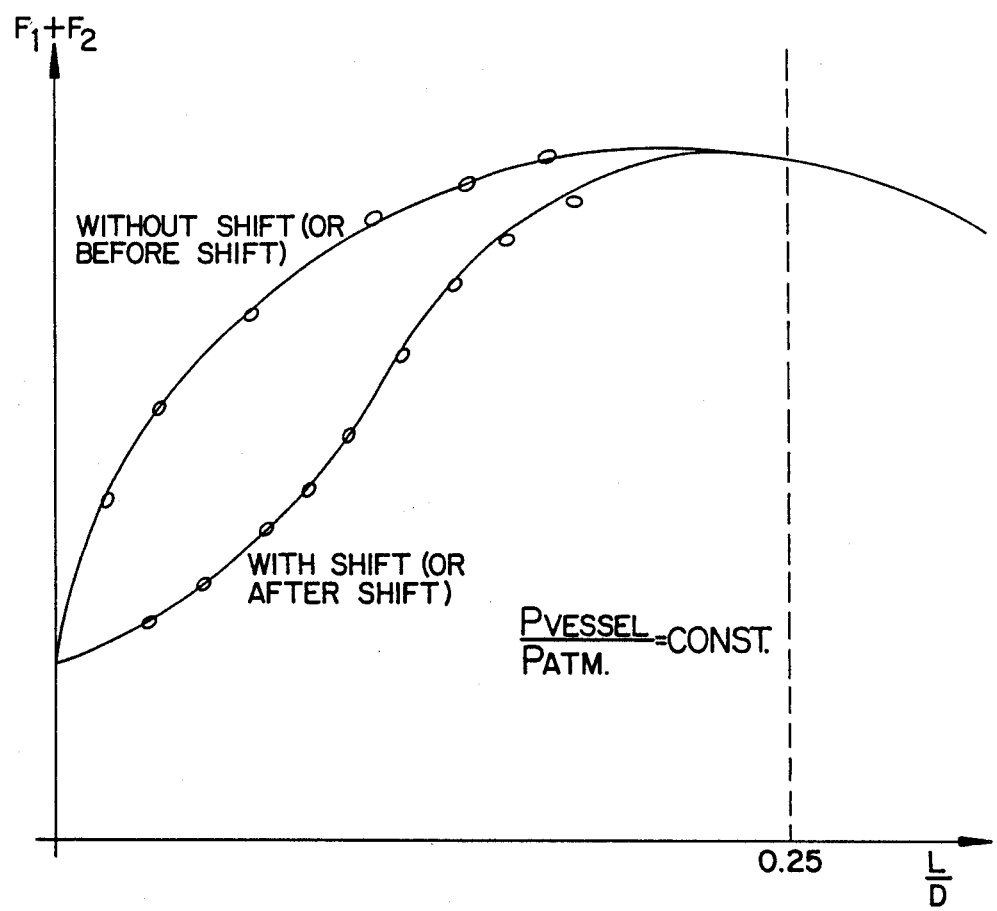

The shift changes the flow path geometry significantly resulting in significant changes in the flowforce $F_1$ plus $F_2$. FIG. 20 shows the force resultant $F_1$ plus $F_2$ acting on the valve stem at constant vessel pressure (valve discharging into the atmosphere) vs. the relative lift L/D.

Prior art valves have a single steady flow force vs. relative lift characteristic. The present invention has a split flow force vs. relative lift characteristic. Depending on the shift value, the fluid force resultant acting on the moving parts, for most of the relative lift values, has values between the curves "with shift" and "without shift" shown in FIG. 20.

Figure 21:
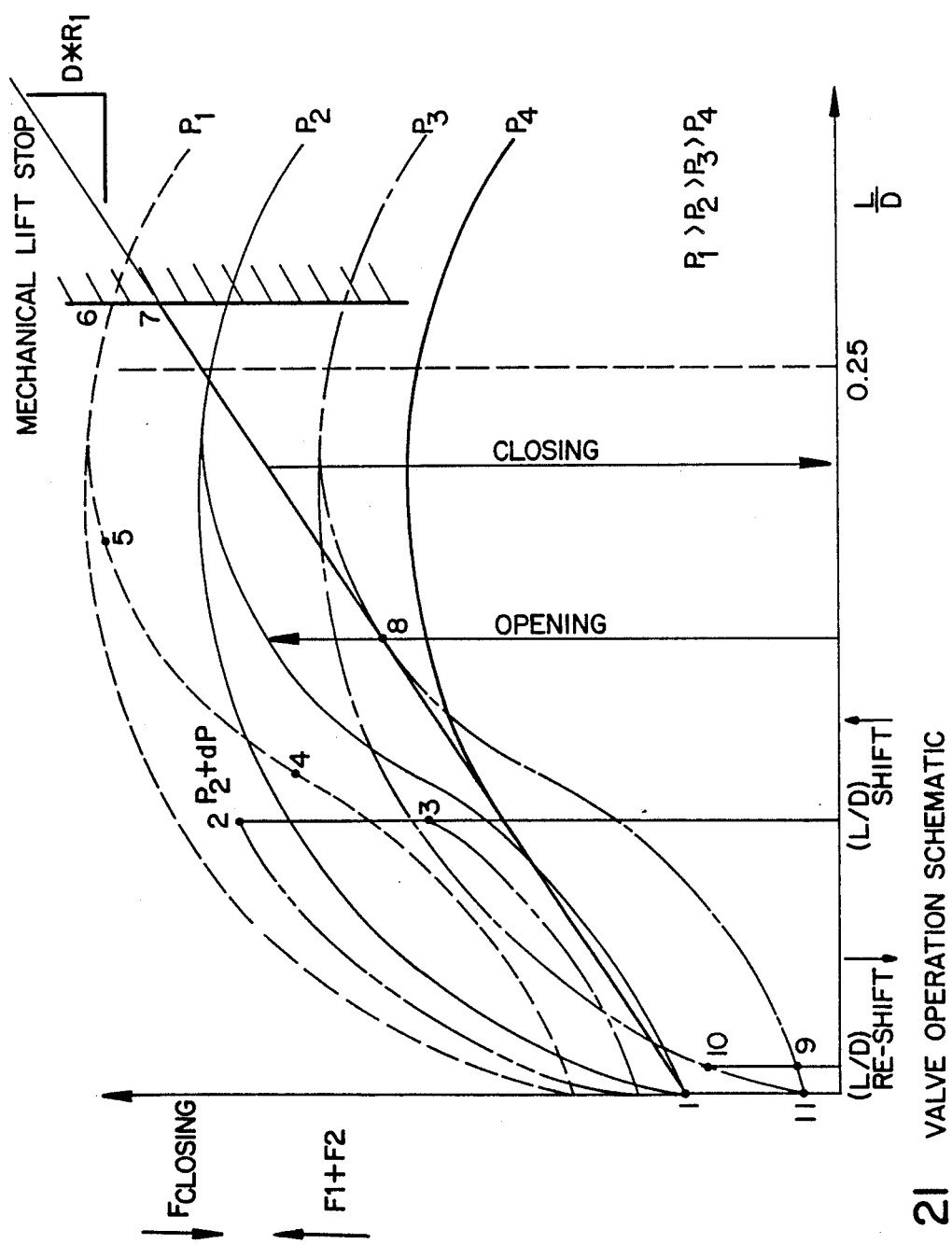

FIG. 21 shows a quasi-steady force balance to explain the valve operation. As shown previously in FIG. 19, the opening flow force characteristic is represented by a split curve $F_1$ plus $F_2$ vs. L/D at constant vessel pressure. This flow force characteristic translates approximately linearly along the force axis with the vessel pressure. The split flow force characteristics at $P_1$, $P_2$ and $P_3$ are shown in FIG. 21. A fourth split flow force characteristic is shown at low lifts and $P_2$ plus $d_p$. A fifth flow force characteristic (fat) is shown only at larger lifts and $P_4$. The closing characteristic is the linear (also fat) closing force vs. relative lift having a slope $DxR_1$ equal to nozzle bore diameter times main spring rate $R_1$.

At vessel pressures less than $P_2$, the valve is closed (L=0). At L/D=0 and $P_3$, the closing force at point 1 is larger than the "hydrostatic" fluid force at point 11. As the vessel pressure increases to $P_2$, the operation point moves vertically up from point 11 to 1. Note that the initial state of the valve geometry is non shifted. At point 1, the opening force is balanced by the closing force. Increasing the vessel pressure from $P_2$ to $P_2+dP$, the point of operation moves from point 1 to 2 along the surface generated by the upper "without shift" branch of the force curve. Obviously, as the point moves from point 1 to 2, the valve lift increases.

At an increasing relative lift value (L/D) shift in FIG. 21, the force $F_2$ overcomes the secondary spring force (the wave spring having the rate $R_2$) and a jump occurs from point 2 to 3 on approximately the same constant vessel pressure $P_2+dP$ curve but on the "with shift" branch of the curve. Further increases in vessel pressure from $P_2+dP$ to $P_3$ move the operation point along the lower surface generated by the shifted flow force curve. That is, from point 3 to 4 and from point 5 to 6 where the valve reaches a mechanical lift stop which comprises a built-in boundary condition. At approximately point 6, a quasi-steady discharging of the fluid occurs with maximum efficiency. As the valve releases fluid, the vessel pressure starts to decrease from $P_1$ to lower values. The operation point moves from point 6 to 7 without lift and/or shift change.

At point 7, for further decreasing vessel pressure, the lift starts to decrease due to the closing force being larger than the opening flow force. The point of operation moves from point 7 to 8. At point 8, the closing curve is tangent to the lower (shifted) branch of the opening curve. As soon as the vessel pressure decreases to $P_3$, the closing force is larger than the opening force and the valve slams shut. Thus, the point of operation moves from point 8 to point 9.

At point 9, the fluid force acting against the secondary spring (wave spring having rate $R_2$) becomes less than the spring force. The secondary spring snaps back to its initial position, re-shifting the diskholder relative to the disk back to its initial geometrical location. The point of operation moves from point 9 to 10 on the branch without shift of the flow force curve $P_3$. Finally, the lift decreases to zero, moving the point of operation from point 10 to 11 on the upper branch of the flow force curve at $P_3$, due to the closing force still being larger than the opening force.

The split mechanical design structure reflected in a split opening flow force (i.e., two branches shift dependent) impact significantly on the valve performance. Prior art valves only have, in the best case, the upper "without shift" branch. The vessel pressure must decrease until the upper branch becomes tangent to the closing curve. Thus the reseating pressure is much lower than $P_3$, leading to a wide valve hysteresis (lift vs. vessel pressure characteristic). The blowdown or difference between the set pressure and reseating pressure $P_4$ is approximately double for a prior art valve than for the valve of the present invention. Additionally, the slope of the blowdown percentage vs. set pressure for a fixed main spring rate $R_1$ is larger, despite geometry adjustments (adjustable rings), in prior art valves relative to the present invention.

Figure 22:
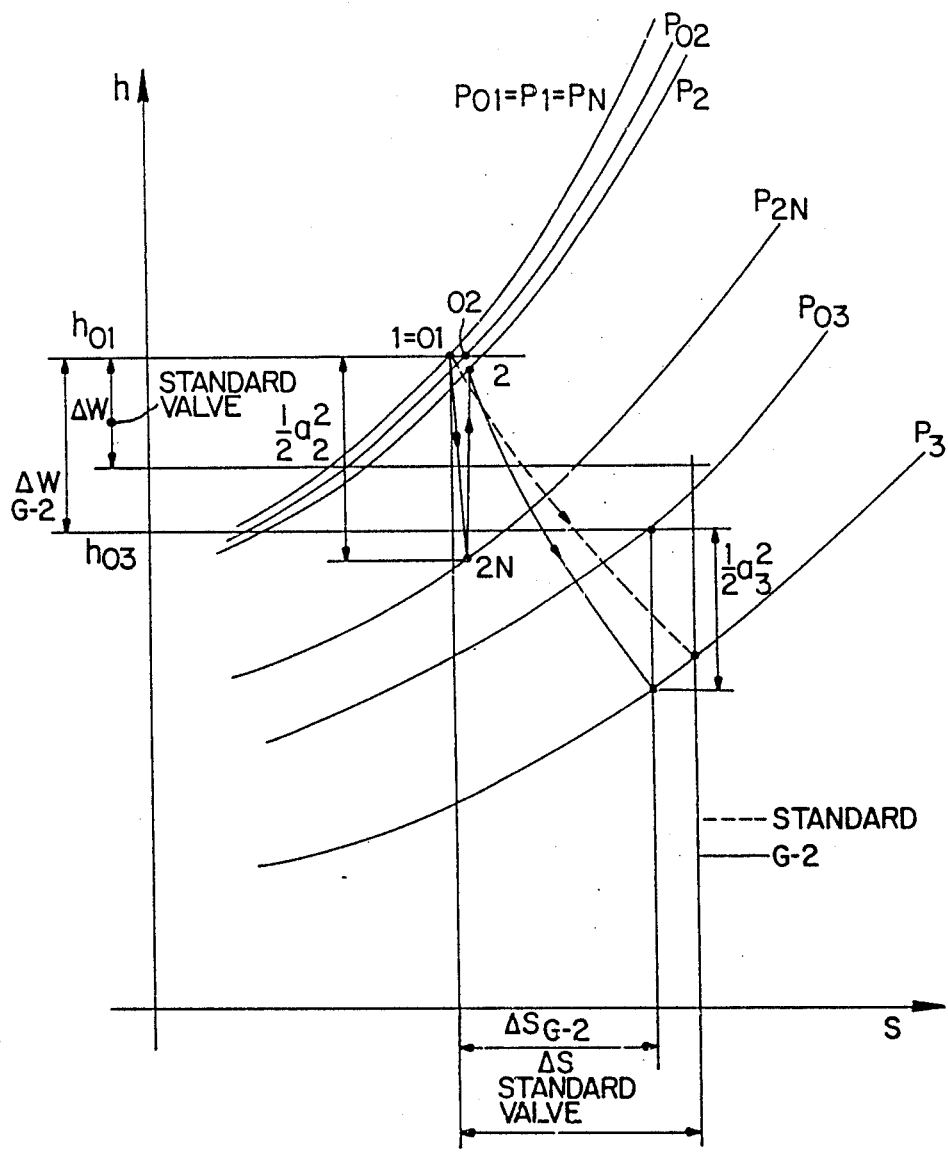

FIG. 22 shows enthalpy "h" versus entropy "s" curves comparing the thermodynamic process of a prior art safety and pressure relief valve process to the thermodynamic process which occurs in a valve construction according to the invention. As shown, the improved valve results in a greater enthalpy change and a lesser entropy change than a prior art valve. During operation of the valve, the vessel pressure or stagnation pressure is continuously changing. The vessel pressure increases to the admissible overpressure and then decreases during discharge and blowdown. FIG. 22 merely represents one frame or one set of h-s curves of the family at a given relative lift value.

The flow path process of the invention comprises three steps which are seen in FIG. 22:

Step 1

The gas at an initial vessel pressure of $P_{01} = P_1 = P$ is accelerated nearly isentropically through the convergent nozzle 54 as represented by segment 1-2N in FIG. 22. The flow velocity reached inside the convergent nozzle through area $A_{12}$ is the local sonic velocity. Thus, the mass flow rate is maximized for given upstream stagnation conditions.

Step 2

Instead of allowing further acceleration of the flow to supersonic velocities, the flow is decelerated nearly isentropically within the flow path of the invention. The deceleration occurs at larger relative lift values within the pressure recovery chamber 69 formed between the guide 43, the nozzle 50, the seat portion 60 and the moving parts 70, 100. Thus, the flow process recovers pressure as shown by segment 2N-02 in FIG. 22. Because the pressure losses are small, the points 01 and 02 actually coincide. Thus, the stagnation pressure $P_{02}$ on the disk 100 is proximate to the inlet stagnation pressure $P_{01}$.

Step 3

The pressure $P_2$ is the average pressure inside the recovery chamber 69, $P_2$ is lower than $P_{02}$ by an amount equivalent to the average subsonic velocity inside the recovery chamber, but still close to $P_0^1$. This average pressure $P_2$ within the recovery chamber 69 lifts the moving parts 70, 100. Thereafter, the flow process continues by discharging in a radial-axial direction from the recovery chamber 69 as shown by segment 2-3 in FIG. 22.

The specific work, i.e. the work rate divided by mass flow rate, equals the difference between the inlet stagnation enthalpy $h_{01}$ and the stagnation enthalpy $h_{03}$. At the end of the process $h_{03}$, is greater for the flow path valve design of the invention than for other valve designs. This results in a greater total to total or total to static valve efficiency.

Figure 23:
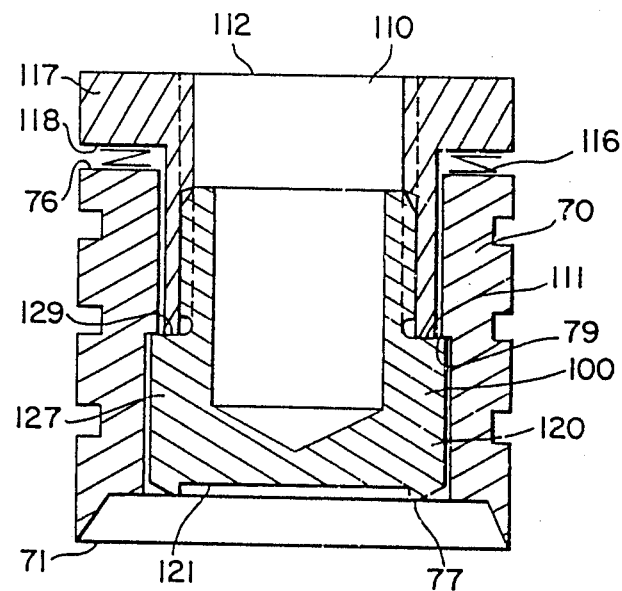

FIG. 23 shows the disk and diskholder of a second embodiment of the invention. The end of the diskholder 70' is provided with a counterbore 77' which defines a shoulder surface 79'. The disk 100' includes a first part 110' and a second part 120'. The first part 110' is an internally-threaded hollow cylinder having a flange 117' at its end 112'. The flange 117' has a shoulder surface 118' that faces toward the end 76' of the diskholder 70'. The second part 120' is an externally-threaded solid cylinder with a flange 127' end 121'. The flange 127' provides a shoulder surface 128' which is adapted to abut against the lower end surface 111 of the first part 110' and to abut against the shoulder surface 79' of the diskholder 70'. The secondary spring (the wave spring having spring rate $R_2$) is preloaded and located in the annular space defined by shoulder surface 118', end 76' and the outer diameter of flange 117' and the shoulder diameter of flange 117'.

In order to prevent pressure build-up in the spring chamber, the bonnet may be vented externally or internally. Such venting is desirable in some situations because of leakage between the higher pressure region under the moving parts and the lower pressure region on top of the moving parts of the valve. A first leakage path is between the disk 100 and diskholder 70, and another leakage path is between the diskholder 70 and guide 43. As soon as high pressure fluid starts to flow through the valve, a build-up of pressure occurs in the spring chamber of the bonnet 44. The increased pressure acts on top of the moving parts and decreases the maximum lift value that can be achieved at a certain overpressure value, for example 10% overpressure relative to set or popping pressure Thus, the mass flow rate and valve stability also decrease with the build-up of pressure in the spring chamber.

The valve previously described in connection with FIG. 2 is an externally-vented pressure relief valve. The bonnet 44' is provided with an external vent hole 130 so that any fluid leakage into the spring chamber is vented to the atmosphere.

Figure 24A:
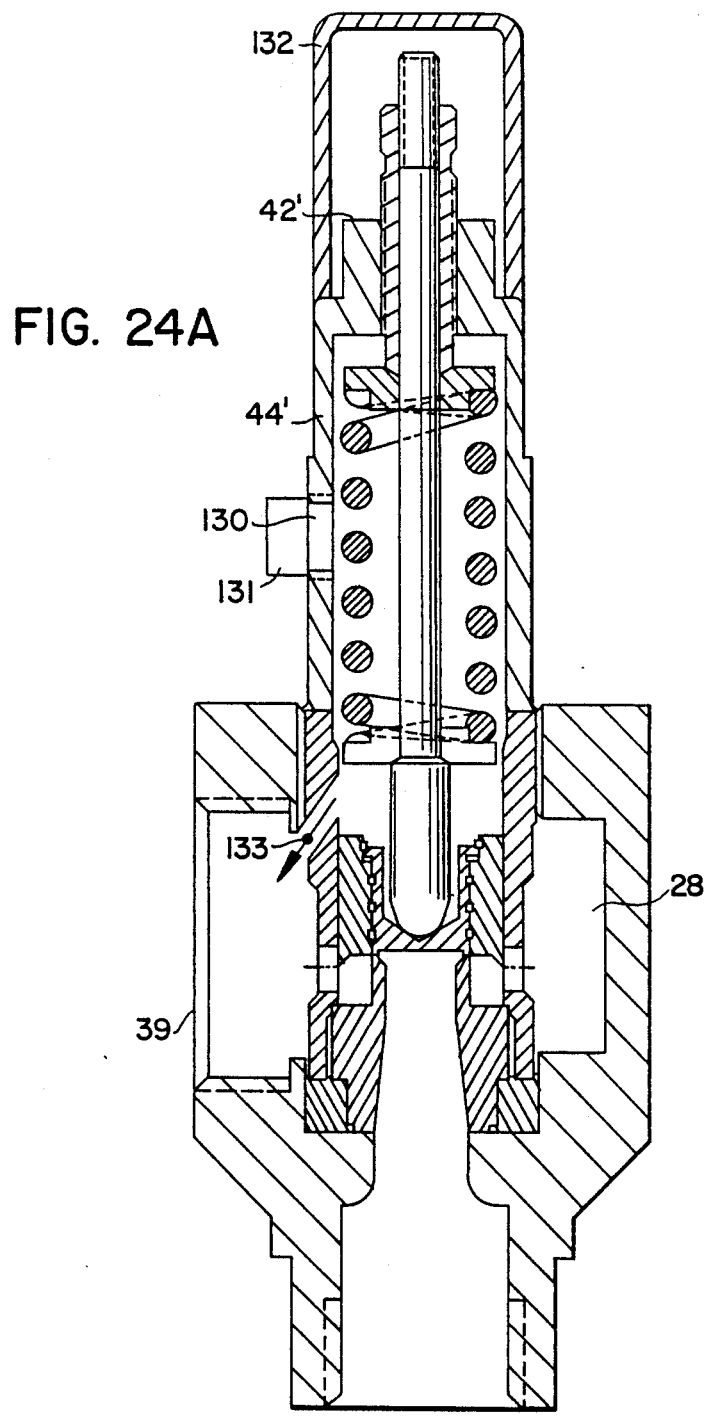
FIG. 24a shows a second embodiment of an internally-vented valve.
Figure 24B:
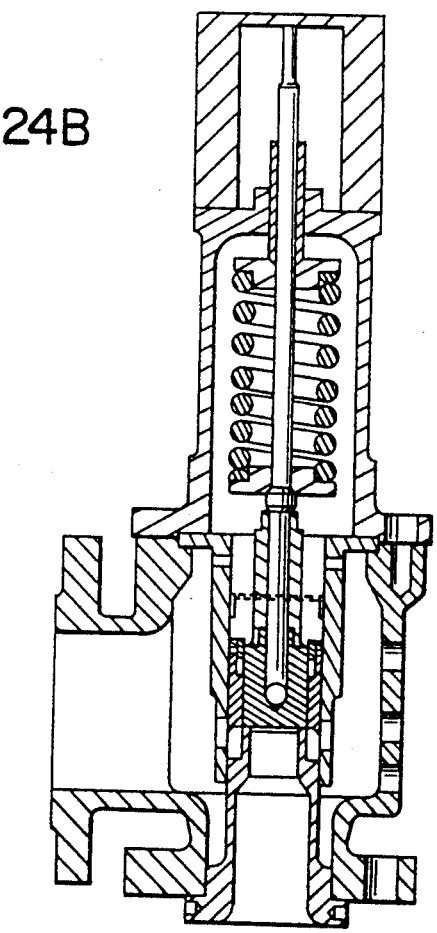
FIG. 24b shows a third embodiment of an internally vented valve.

FIG. 24 shows an internally-vented pressure relief valve which prevents fluid leakage to the atmosphere. The valve is made leaktight by plugging the external vent hole 130 in the bonnet 44' and installing a cap 132 over the end 42' of the bonnet 44'. A number of sufficiently large communication holes or passages 133 are provided between the spring chamber and the valve bowl 28.

Figure 25:
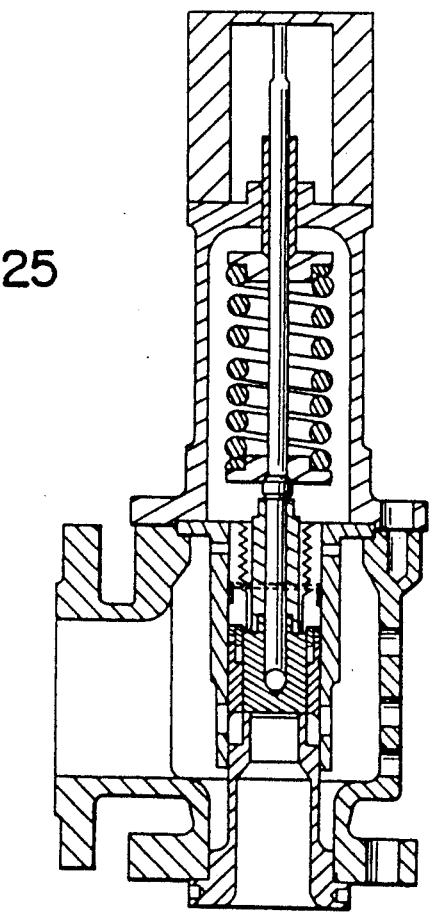

FIG. 25 shows a second embodiment of an internally-vented pressure-relief valve A bellows 135, sealing rings or a BALANSEAL is used to prevent pressure build-up behind the projectional seat area of the moving parts.

Figures 26A, 26B:
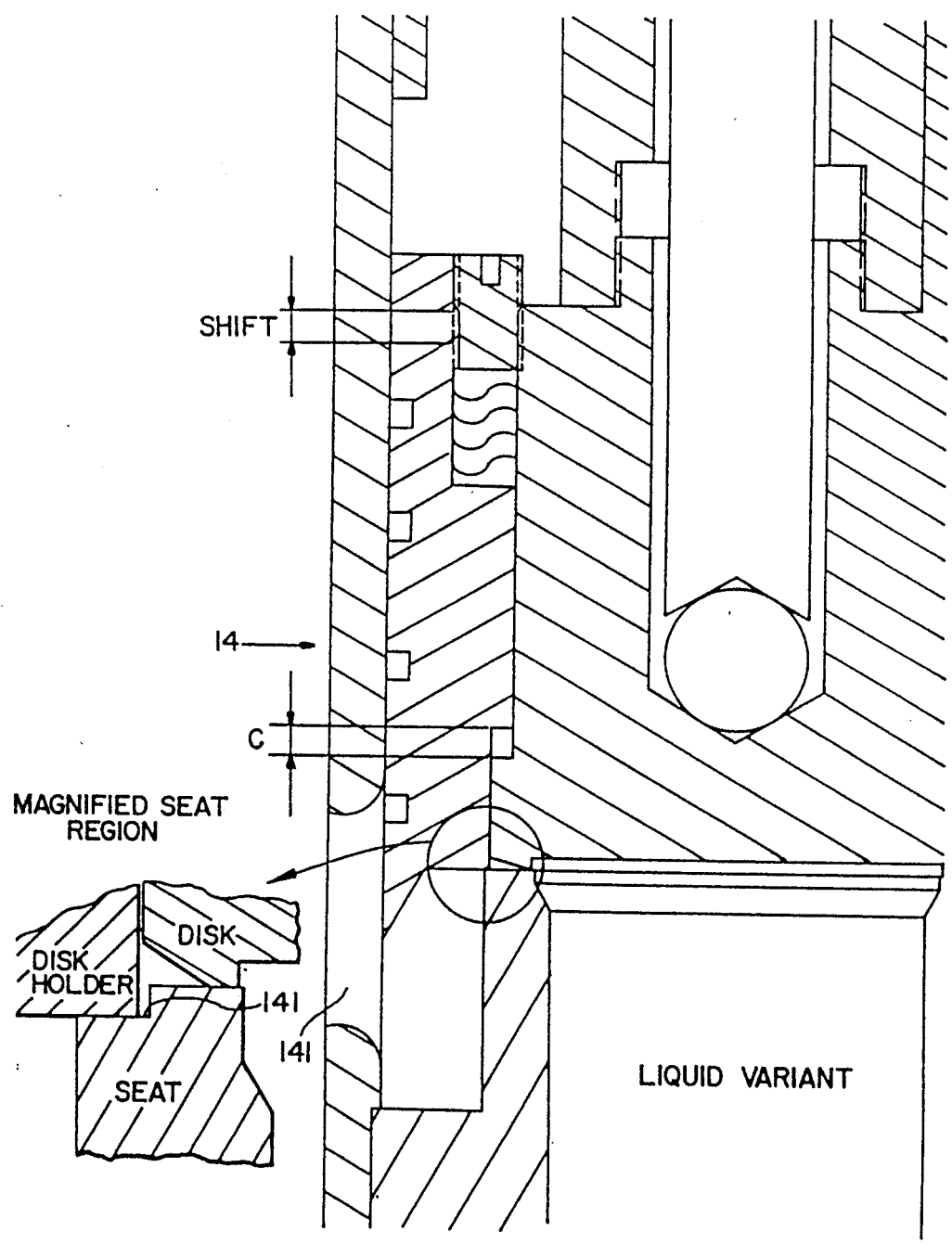
FIG. 26 shows an alternative embodiment of the moving parts of the valve.

FIG. 26 shows a second flow path for larger pressure liquid and two-phase flow applications. The second flow path variant has an additional annular axial clearance 140 between the disk 100" and the diskholder 70". The nozzle seat has a step or shoulder 141 for supporting the diskholder and creating a radial annular interstice. The diskholder, loaded by the precompressed secondary (wave) spring and its own weight, rests initially at zero lift ($L=0$) on the nozzle seat shoulder or step. The disk (lifted by increasing vessel pressure) travels in an upward direction creating a lift L between the disk 100" and the seat. The diskholder 70" rests against the step 141 while the disk 100" moves relative to the diskholder 70".

As the disk 100" moves relative to the diskholder 70", fluid penetrates radially outward under an area defined by the outer diameter of the disk 100". The radial clearance between the diskholder inner diameter and seat outer diameter is relatively large compared to the zero axial clearance between the diskholder and nozzle seat. The axial clearance between the diskholder and nozzle seat shoulder is zero for all practical purposes and for lift values from zero to c in the valve opening direction. By maintaining zero axial clearance, no dynamic pressure component develops under the disc for $L=0$ to c in the opening direction. This flow interdiction while the disk is opening prevents the "cave-in" of the flow force vs. lift characteristic measured at constant vessel pressure.

Figure 27:
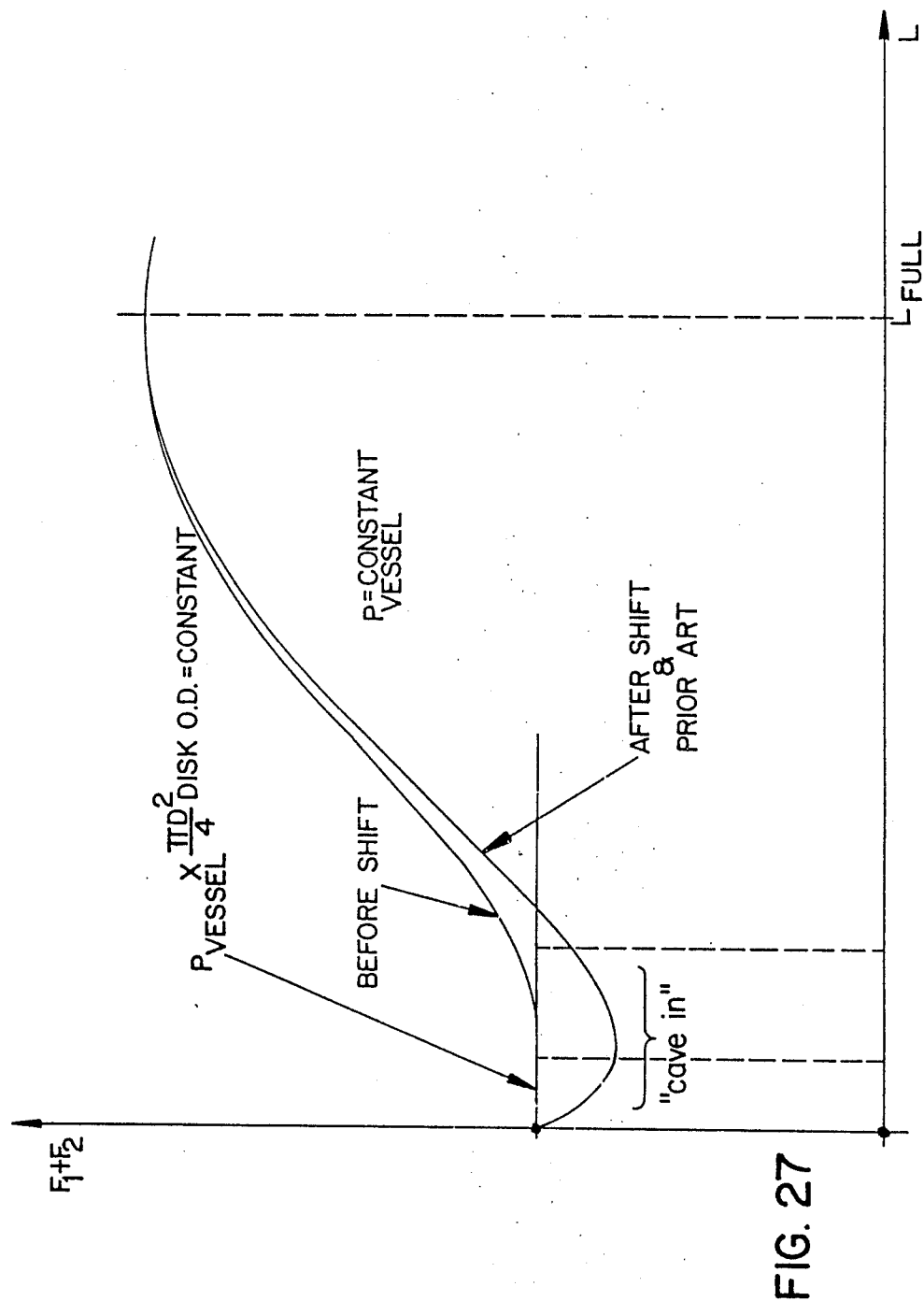
FIG. 27 shows a comparison of liquid flow forces vs. lift at constant vessel pressure.

FIG. 27 shows liquid flow force curve of the prior art relative to the present invention. The prior-art has a "cave-in" effect exhibiting a negative flow force slope for lift increasing from zero and constant vessel pressure. In other words, the flow force decreases with increasing vessel pressure and lift as the valve commences to open. This has the consequence of strong valve instabilities and large overpressures required to fully open the valve.

The present invention has a second flow path variant which circumvents these liquid specific problems (incompressibility) by:

1. letting the hydrostatic vessel pressure penetrate under an area determined by the disk outer diameter with practically no massflux, 2. providing a much larger slope of the massflow rate controlling orifice area vs. lift, or the rate at which the minimum area between the nozzle seat and diskholder increases with the lift (this larger rate compensates via momentum the pressure defect occurring at the start to flow time), and 3. providing a cost effective zero axial clearance and relative large radial clearance design.

The principles of the invention may be embodied in a wide variety of flow controlling devices, so it is emphasized that the invention is not limited solely to the embodiments described and illustrated in this specification. The invention is embracing of many diverse devices which fall within the spirit of the following claims.

What is claimed is:

1. A safety and pressure relief valve for substantially preventing supersonic flow near pressure sensitive parts of the valve, comprising:

a valve seat positioned between a fluid inlet and a fluid outlet;

a pressure sensitive valve disk positioned against said seat and adapted to lift relative to said seat for permitting fluid flow through the valve; and a pressure sensitive diskholder positioned about the periphery of said disk and adapted to move relative to said disk during lift of said disk, said diskholder extending beyond said disk for deflecting the fluid flow.

2. A safety and pressure relief valve according to claim 1, wherein said diskholder is shiftably-positioned on said disk.

3. A safety and pressure relief valve according to claim 1, wherein said diskholder includes a skirt extending from an axial end of said diskholder.

4. A safety and pressure relief valve according to claim 3, wherein said skirt includes an angular surface for deflecting flow of the fluid.

5. A safety and pressure relief valve according to claim 1, further comprising:

a guide positioned about the periphery of said diskholder, said guide adapted to guide the movement of said disk relative to said seat.

6. A safety and pressure relief valve according to claim 5, wherein said diskholder is movably-positioned on said disk, and said diskholder and said disk are shiftably-positioned as a unit within said guide.

7. A safety and pressure relief valve according to claim 6, wherein said diskholder includes a skirt at a first axial end of said diskholder.

8. A safety and pressure relief valve according to claim 7, wherein said skirt includes an angular surface for deflecting the flow of the fluid.

9. A safety and pressure relief valve according to claim 7, further comprising:

a nozzle positioned in a first axial end of said guide, said nozzle extending between said fluid inlet and said seat.

10. A safety and pressure relief valve according to claim 9, wherein said seat, said disk, said diskholder and said nozzle are coaxially-positioned in said guide.

11. A safety and pressure relief valve according to claim 10, wherein said seat is positioned at the downstream end of said nozzle, the diameter of the outer surface of said seat being approximately one half the diameter of the inner surface of said guide so as to define a pressure recovery chamber between said seat and said guide.

12. A safety and pressure relief valve according to claim 11, wherein at least one exit opening is provided in said guide adjacent said chamber, the central axis of a said opening being transverse to the central axis of said guide.

13. A safety and pressure relief valve according to claim 11, wherein said skirt on said diskholder projects approximately to the central axis of a said opening when said disk is in a closed position.

14. A safety and pressure relief valve according to claim 13, wherein said skirt on said diskholder projects to a point approximately halfway between the central axis and the outer diameter of said opening when said disk is in an open position and before said diskholder shifts relative to said disk.

15. A safety and pressure relief valve according to claim 14, wherein said skirt on said diskholder is spaced from a said opening when said disk is in an open position and after said diskholder shifts relative to said disk.

16. A safety and pressure relief valve according to claim 9, further comprising:

retaining means for shiftably retaining said diskholder on said disk.

17. A safety and pressure relief valve according to claim 16, wherein said retaining means comprises:
a flange on said disk defining a shoulder surface;
a counterbore in said diskholder defining a shoulder surface;
a retaining ring positioned in said counterbore and spaced from said shoulder surface in said counterbore, said flange of said disk being positioned between said shoulder surface and said retaining ring of said diskholder such that said retaining ring abuts against the second axial end of said disk;
a shifting space defined between said shoulder surface of said disk and said shoulder surface of said diskholder, said shoulder surface of said diskholder adapted to abut against said shoulder surface of said disk in order to limit the shifting movement of said diskholder relative to said disk.

18. A safety and pressure relief valve according to claim 17, further comprising:
biasing means positioned in said shifting space for biasing said shoulder surface of said diskholder away from said shoulder surface of said disk.

19. A safety and pressure relief valve according to claim 18, wherein said biasing means comprises a wave spring or any other spring.

20. A safety and pressure relief valve according to claim 16, wherein said retaining means comprises:
a first flange at a first axial end of said disk defining a first shoulder surface;
a second flange at a second axial end of said disk defining a second shoulder surface;
a counterbore at a first axial end of said diskholder defining a first shoulder surface, and a second axial end of said diskholder defining a second shoulder surface, said first flange of said disk adapted to fit within said counterbore of said diskholder such that said first shoulder surface of said diskholder abuts against said first shoulder surface of said disk;
a shifting space defined between said second shoulder surface of said diskholder and said second shoulder surface of said disk, said second shoulder surface of said diskholder adapted to abut against said second shoulder surface of said disk in order to limit the shifting movement of said diskholder relative to said disk.

21. A safety and pressure relief valve according to claim 20, further comprising:
biasing means positioned in said shifting space for biasing said second shoulder surface of said diskholder away from said second shoulder surface of said disk.

22. A safety pressure relief valve according to claim 21, wherein said biasing means comprises a wave spring or any other spring.

23. A safety and pressure relief valve according to claim 16, further comprising:
a valve bowl body having a high-pressure inlet chamber, a low-pressure outlet chamber a valve chamber between said inlet and outlet chambers, said guide being positioned within said valve chamber to control the flow of the fluid between said inlet and outlet chambers.

24. A safety and pressure relief valve according to claim 23, wherein said inlet chamber, said valve chamber and said outlet chamber are coaxial 25. A safety and pressure relief valve according to claim 24, wherein said outlet chamber has an outlet opening having a central axis which is transverse to the central axis of said outlet chamber.

26. A safety and pressure relief valve according to claim 25, further comprising:
biasing means for biasing said disk against said seat.

27. A safety and pressure relief valve according to claim 26, further comprising:
a bonnet having a spring chamber for housing said biasing means.

28. A safety and pressure relief valve according to claim 27, wherein said bonnet and said guide together form a cartridge which includes said nozzle, said seat, said disk, said diskholder and said biasing means.

29. A safety and pressure relief valve according to claim 28, wherein said bonnet of said cartridge is externally-vented to prevent pressure build-up in said spring chamber.

30. A safety and pressure relief valve according to claim 29, wherein an opening to the atmosphere is provided in said bonnet.

31. A safety and pressure relief valve according to claim 28, wherein said bonnet portion of said cartridge is internally-vented to prevent pressure build-up within said spring chamber.

32. A safety and pressure relief valve according to claim 31, wherein a passage is provided between said spring chamber and said outlet chamber.

33. A safety and pressure relief valve, comprising:
a seat means, a poppet means, and a skirt means which are all movable relative to each other;
said poppet means normally being seated on said seat means and being liftable therefrom to provide an escape orifice when a pressure differential across said poppet means reaches a predetermined level;
said skirt means being movable between an operative position which it occupies during lifting of said poppet means and a retracted position which it occupies during reseating of said poppet means, said skirt means when in its operative position being operable to reduce the flow of fluid downstream of said escape orifice to prevent the velocity of fluid in the valve from becoming supersonic.

34. A safety and pressure relief valve according to claim 33, wherein the skirt means is a sleeve which is axially slidable on the poppet means.

35. A safety and pressure relief valve according to claim 34, wherein the skirt means has a fluid-deflecting surface which is positioned in the path of fluid released from the escape orifice when the poppet starts to lift from the seat.

36. A safety and pressure relief valve according to claim 35, wherein the fluid-deflecting surface is oriented so that fluid escaping from the orifice exerts an axial force on the skirt means tending to move the skirt means to its retracted position.

37. A safety and pressure relief valve according to claim 33, wherein, when the poppet starts to lift from the seat, there is a flow passage which includes the following components in series:
(a) the escape opening formed by surfaces of the seat means and poppet means,
(b) a chamber formed by surfaces of the seat means, the poppet means and the skirt means,
(c) a constriction formed between the seat means and the skirt means, and (d) a chamber formed between the seat means and the skirt means.

38. A safety and pressure relief valve, comprising:

first pressure sensitive means, mounted to move relative to a valve seat, for permitting fluid flow through the valve; and second pressure sensitive means, mounted to move relative to said first pressure sensitive means as said first pressure sensitive means moves relative to said valve seat, for substantially controlling supersonic flow proximate said first pressure sensitive means.

39. A safety and pressure relief valve according to claim 38 wherein said first pressure sensitive means comprises:

a valve disk positioned on and adapted to move relative to said seat.

40. A safety and pressure relief valve according to claim 39 wherein said second pressure sensitive means comprises:

a diskholder positioned downstream of said disk, said diskholder adapted to deflect fluid flow and to move relative to said disk.

41. A safety and pressure relief valve according to claim 40 further comprising:

a convergent-divergent nozzle positioned upstream of said disk and said seat, said convergent-divergent nozzle diverges toward said disk and has an end forming said valve seat; and a guide positioned downstream of said diskholder, said guide having at least one opening.

42. A safety and pressure relief valve according to claim 41 wherein said disk has an end for sitting flush against said end of said seat, said end of said disk being frustoconically shaped to form an annular huddling chamber between said disk, said seat, and said diskholder.

43. A safety and pressure relief valve according to claim 42 wherein the axial edge of said diskholder has a skirt extending beyond the axial end of said disk and partially over said exit opening to form a second annular huddling chamber between said diskholder, said nozzle, and said guide.

* * * * *